United States Patent [19]

Pagnozzi et al.

[11] 4,194,296
[45] Mar. 25, 1980

[54] VACUUM DRYING KILN

[76] Inventors: Vincenzo Pagnozzi, Via Ponte Romano, Rocchetta di Cairo (Savona); Ernesto G. Pagnozzi, Via Camponuovo, Loppa, Cairo Montenotte (Savona), both of Italy

[21] Appl. No.: 902,632

[22] Filed: May 4, 1978

[30] Foreign Application Priority Data

May 17, 1977 [IT] Italy .............................. 68116 A/77

[51] Int. Cl.² .............................................. F26B 5/04
[52] U.S. Cl. ......................................... 34/16.5; 34/15; 34/76; 34/77; 34/92
[58] Field of Search ..................... 34/15, 16.5, 76, 77, 34/78, 92

[56] References Cited

U.S. PATENT DOCUMENTS

| | | | |
|---|---|---|---|
| 2,621,492 | 12/1952 | Beardsley et al. | 34/15 X |
| 3,921,309 | 11/1975 | Nakayashiki | 34/16.5 |

*Primary Examiner*—John J. Camby
*Attorney, Agent, or Firm*—Sughrue, Rothwell, Mion, Zinn and Macpeak

[57] ABSTRACT

A vacuum drying kiln has a drying chamber in which, in use, is placed timber to be dried and around which is a surrounding water jacket through which is circulated a heat exchange fluid which derives its heat by flowing through the secondary circuit of a heat exchanger through the primary circuit of which is pumped a mixture of air and water vapor drawn by a vacuum pump from the interior of the drying chamber. The kiln is operated cyclically through successive heating and evacuation phases and the vacuum pump is one utilizing a secondary fluid to effect pumping, the characteristics of this secondary fluid being that it is immiscible with water and has a low specific heat so that it encourages the condensation of the water vapor in the primary circuit of the heat exchanger by undergoing large temperature variations for small changes in heat content.

15 Claims, 2 Drawing Figures

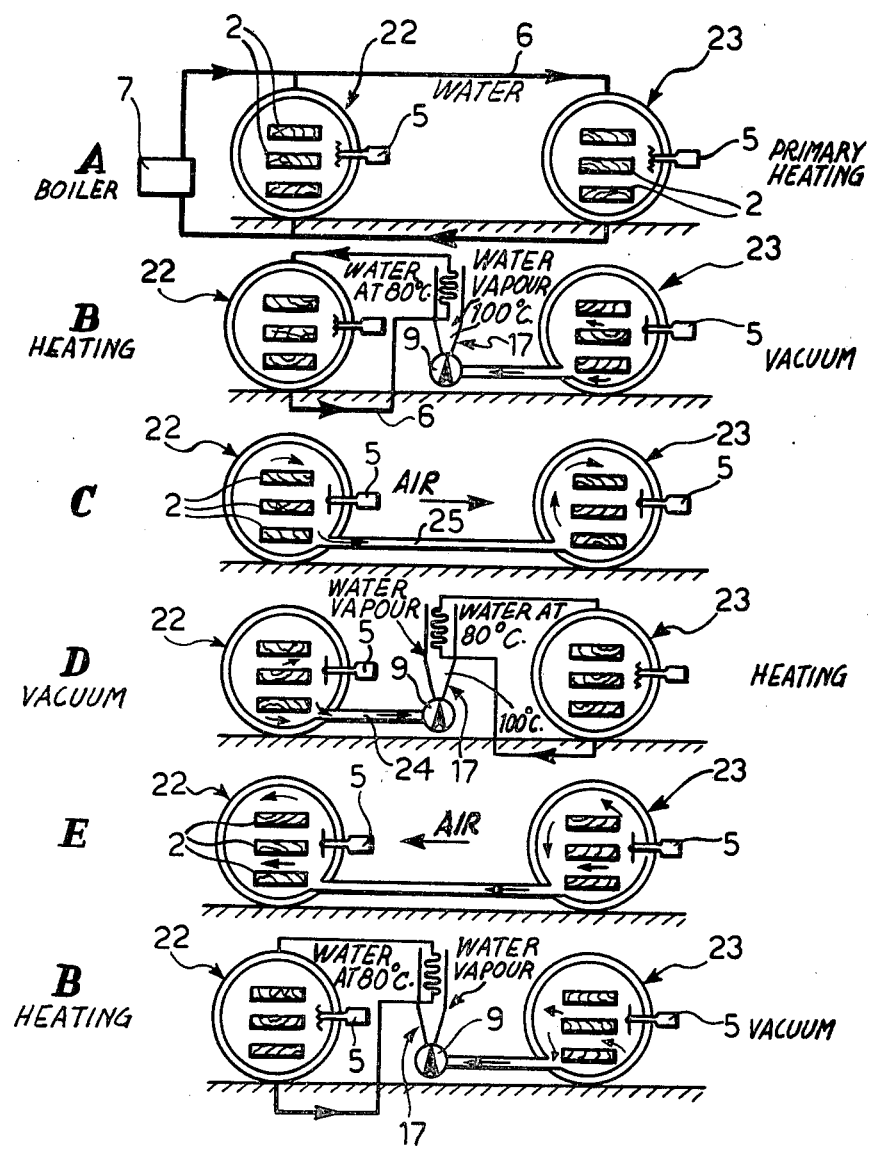

VACUUM DRYING KILN

BACKGROUND OF THE INVENTION

The present invention relates to vacuum drying kilns, and particularly to drying kilns for timber, of the kind comprising at least one drying chamber, a vacuum pump connected to the said chamber and operable to produce in it a depression for the purpose of evaporating moisture contained in the wood, and a heating element operable to heat the interior of the chamber, and hence to raise the temperature of timber placed therein.

It is known that the heat required for drying timber, whatever the drying system used, consists of a first quantity of heat for evaporating the free water of the wood (known as the vaporisation heat) and a second quantity of heat for freeing the water which impregnates the cellular membranes (known as hygroscopic heat).

The relative quantities of evaporation heat and hygroscopic heat are very important in drying timber. More exactly, the quantity of vaporisation heat Q, (generally, but not always, expressed with reference to a kilogram of water evaporated) is related to the drying temperature T, by the formula:

$$Q = 606.5 - 0.695\ T\ \text{Cal/Kg of water evaporated.}$$

For example, if the operating temperature is 60° C., then the quantity of vaporisation heat corresponds to 555 calories per evaporated liter of water for any kind of unseasoned timber.

The quantity of hygroscopic heat can be calculated by the known KOLLMANN formula, which expresses this quantity of heat in terms of the saturation point of the cellular membranes of the wood and of the final moisture content of the wood. This quantity of heat is generally, but not always, expressed with reference to one kilogram of anhydrous wood. For pre-seasoned timer, again of any type, the order of magnitude of the quantity of hygroscopic heat in relation to the quantity of vaporisation heat can be more than 5 percent, while for damp unseasoned wood it is less.

Another heat quantity to be considered in timber drying is the heat lost with the air which is discharged from the kiln, which is often referred to as the discharged heat. This loss of discharged heat is difficult to calculate, but is nevertheless quite considerable; for example, it is known from practical experience that it can be between 10 percent and 20 percent of the quantity of vaporisation heat.

Moreover, there is another source of heat loss in vacuum drying kilns, that is the depression heat, which is lost due to thermodynamic effects. In fact, the vaporisation heat at normal atmospheric pressure (760 torr) is 539.9 calories per liter of water evaporated, whilst at the lower pressure of 40 torr, it is 577.5 calories per liter. It can be seen that at the lower pressure there is an extra heat requirement of 37.6 calories per liter, equal to about 7%. In vacuum drying kilns there is yet another source of heat loss, that is the thermal equivalent of the work done by the vacuum pump.

OBJECTS OF THE INVENTION

The main object of this invention is to provide a vacuum drying kiln which is especially suitable for timber, in which the vaporisation heat, the hygroscopic heat, and the depression heat which are all transferred to the water vapour extracted from the timer in use of the kiln can be at least partly recovered.

Another object of the present invention is to provide a vacuum drying kiln in which the thermal equivalent of the work of the vacuum pump can be at least partly recovered and re-used.

Yet another object of the present invention is to provide a vacuum drying kiln in which at least part of the discharged heat can be recovered and re-used.

Still another object of the present invention is to provide a vacuum drying kiln in which the quantity of heat necessary for humidifying the air, when this is required for proper drying is restricted to a low value.

SUMMARY OF THE INVENTION

According to the present invention, a vacuum drying kiln comprises at least one drying chamber, a vacuum pump connectable with the said chamber and operable to produce in the chamber a pressure reduction for the purpose of evaporating water contained in the wood, and heating means operable to transfer heat to the interior of the chamber, characterised in that it is formed as a heat pump operable to extract the heat contained in the water vapor drawn from the wood at the operating temperature, and to extract from the water vapor heat corresponding to the thermal equivalent of the work done on it by the vacuum pump, and to raise the temperature of this heat above the said operating temperature and to transfer it back to the interior of the said vacuum chamber via the said heating means.

Further characteristics and advantages of the invention will become apparent from a consideration of the following detailed description with reference to the accompanying drawings which is provided purely by way of non-restrictive example.

BRIEF DESCRIPTION OF THE DRAWINGS

FIG. 2 is a series of schematic diagrams of a double chamber vacuum drying kiln according to the invention, showing various successive stages in the operation of the kiln.

DESCRIPTION OF THE PREFERRED EMBODIMENTS

Figure 1:
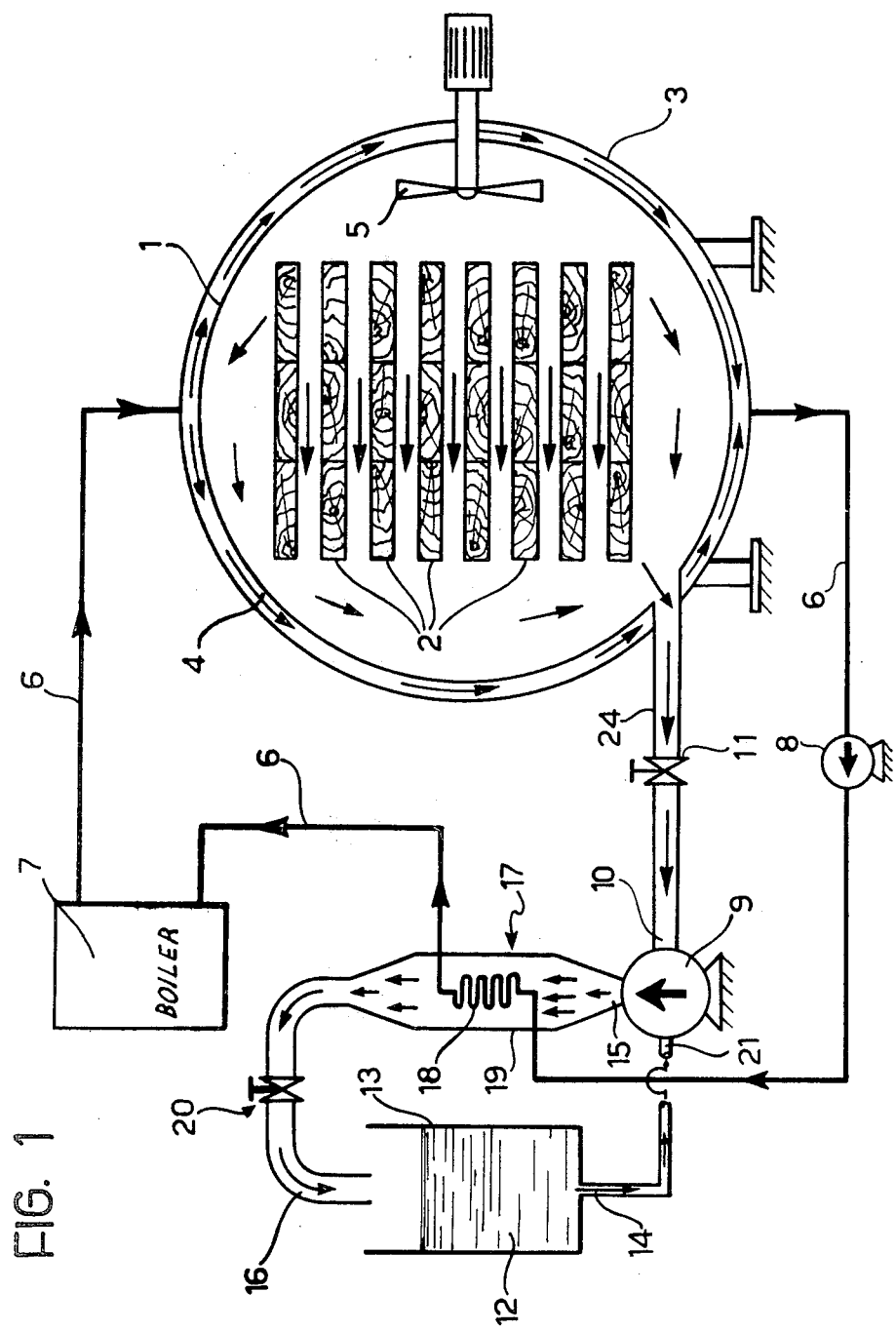
FIG. 1 is a schematic diagram of a single chamber vacuum drying kiln according to the invention.

Referring to FIG. 1, there is shown a vacuum drying kiln comprising a cylindrical chamber 1 made of sheet steel, hermetically sealed, by covers at the ends (not shown) and having support means (also not shown) designed to carry the timber 2 to be dried in the kiln. Around the cylindrical chamber 1 there is placed a metal jacket 3 spaced from the wall of the chamber 1 and forming, with it, an interspace 4. In this interspace a primary fluid such as hot water is circulated as described in our copending U.S. Patent Application Ser. No. 794,587, filed May 6, 1977.

Within the drying chamber are located an array of fans (only one of which is illustrated in FIG. 1) and the interspace 4 is put into communication with a boiler 7 and with a circulator pump 8 by means of a pipe circuit 6. The whole wall 1 of the drying chamber thus constitutes a heating element which serves to transfer heat from the water circulating in the pipe 6 to the drying chamber and, consequently, to the timber 2 contained therein.

The interior of the drying chamber communicates, via a duct 24 in which there is a closable valve 11, with a vacuum pump of the liquid ring type. As is known, this type of vacuum pump operates by the presence of a secondary fluid 12 which is centrifuged by the pump's rotor, forming a sealing ring. The secondary fluid 12 is generally water, but for efficiency of the pump, the temperature of the secondary fluid 12 has to be maintained below the boiling point thereof at the low pressure conditions existing in the pump, and for this reason other liquids are sometimes used.

The secondary fluid 12 for the pump 9 is held in a reservoir 13 which feeds the pump through a pipe 14 connected to the pump inlet port 21. The output port 15 of the pump 9 is connected to a primary circuit 19 of a heat exchanger 17 which discharges through a pipe 16 into the reservoir 13. The secondary fluid 12 must be one the boiling point of which is higher than that of water, and the specific heat of which is less than 1, preferably less than 0.5; likewise the secondary fluid should not be miscible or emulsionable with water, and the density of the secondary fluid should be notably different from that of water.

According to the present invention, this secondary fluid is preferably a diathermic oil, having the following characteristics:
—specific gravity between 0.750 and 0.9 at 15° C.
—flash point higher than 200° C.
—viscosity index 95
—viscosity:
2.8 Engler at 50° C.
1.45 Engler at 100° C.
1.34 Engler at 114° C.
—flow point—14° C.
—specific heat 0.4 calories/°C.

The secondary circuit of the heat exchanger 17 is connected in the pipe 6 in series between the circulator pump 8 and the boiler 7.

The discharge pipe which conveys the secondary fluid to the reservoir 13 from the heat exchanger 17 has a control valve 20 therein, adjustable to regulate the pressure in the primary circuit of the heat exchanger 17.

Through the primary 19 of the heat exchanger 17 there are conveyed the water vapour extracted from the wood by means of the vacuum pump 9 and the secondary fluid 12 which passes through pump 9.

OPERATION

The timber drying kiln, illustrated in FIG. 1, operates as follows. The first stage of operation is pre-heating to bring the wood 2 to the desired operating temperature. This is achieved by firing the boiler 7, to a temperature which in practice rarely exceeds 90° C., energising the circulator pump 8 and driving the fans 5. In this stage of operation the pump 9 is de-energised and the valve 11 is closed.

When the wood has reached the desired temperature, the vacuum pump 9 is energised and the valve 11 is opened: at the same time the boiler 7 is turned off but the circulator pump 8 continues to operate. The pressure in the drying chamber 1 falls and evaporation of the water from the wood takes place. The water vapour is drawn from the chamber 1 through the valve 11 and is driven by the vacuum pump 9, together with the secondary fluid of the pump 9 into the heat exchanger 17. Upon passage through the pump 9 the water vapour and secondary fluid receive an increase of heat, corresponding to the thermal equivalent of the work expended by the pump 9. This heat increase causes a considerable rise in temperature of the water vapour and secondary fluid which, on the delivery side 15 of the pump 9 reaches values up to and beyond 140° C., whilst the temperature of the water vapour at the input of the pump 9 is usually, in practice only about 60°–70° C.

In the heat exchanger 17 the water vapour and secondary fluid mixture is cooled by the action of the water passing through the secondary 18 and which is at a much lower temperature than that of the water vapour and secondary fluid mixture passing through the primary. The temperature difference between the mixture in the primary and water in the secondary is generally between 40° C. and 60° C.

In the following part of the description, and in the claims, the water which circulates through the pipe 6, the secondary 18 of the heat exchanger 17, and the interspace 4 will be termed the "primary fluid".

The temperature and pressure conditions in the primary 19 of the heat exchanger 17 are adjusted so that substantially all the water vapour extracted from the wood is condensed in the heat exchanger transferring the heat of condensation to the primary fluid, together with a quantity of heat corresponding to the thermal equivalent of work done by the pump 9. The temperature of the primary fluid contained in the interspace 4, in the pipe 6, and in the boiler 7 thus rises as it collects this recovered heat.

At this point the behaviour of the secondary fluid should be noted. Because the specific heat of this secondary fluid is low its temperature increases or falls considerably when it absorbs or loses heat, respectively. Thus, when the secondary fluid is passing through the vacuum pump 9 and absorbing the thermal equivalent of the work done on it by the pump 9 it undergoes a considerable increase in temperature. This fact is very important, because, as is known from the first principle of thermodynamics, in order to be able to transfer the condensation heat of the water vapour extracted from the wood back to the wall of the chamber it is essential to raise the temperature of the heat transfer medium (the primary fluid) beyond the value of the operating temperature of the said wall, and this is achieved due to the properties of the secondary fluid and the work done on it by the vacuum pump.

As the secondary fluid passes through the heat exchanger, it undergoes rapid cooling from this high temperature as a result of the transference of heat to the primary fluid, and this greatly encourages the condensation of the water vapour. The condensation heat is then absorbed by the secondary fluid and transferred to the primary fluid. The primary 19 of the heat exchanger 17 thus acts as a mixing condenser between the water vapour and the secondary fluid.

The primary fluid, driven by the circulator pump 8, is pumped into the interspace 4 where it is in contact with the heating wall 1 and it thus cools as the heat is transferred into the drying chamber; it then returns to the heat exchanger 17 in which it absorbs heat, becoming hot. This is repeated cyclically.

Alternatively, the water vapour and secondary fluid heated by its passage through the vacuum pump 9 can be fed back directly into the interspace 4, where it contacts the heating wall 1, so that a simple cycle, between the interspace 4 and the pump 9, is employed. In this case the primary fluid is replaced by the mixture of secondary fluid and water vapour and condensation takes place in the interspace 4 transferring heat to the heating wall 1.

In either case the temperature of the primary fluid or of the mixture of water and secondary fluid emerging from the interspace 4 must be less than (or at most equal to) the condensation temperature of the water vapour at the prevailing pressure. In the embodiment of FIG. 1 the condensation temperature can be adjusted by varying the pressure prevailing in the primary 19 of the heat exchanger 17, by regulating the valve 20.

From the foregoing description it will be clear how the vaporisation heat, the hygroscopic heat, and the thermal equivalent of the work done by the vacuum pump 9 are recovered. Less obvious is the manner in which the depression heat is recovered; however, in order to understand this it is only necessary to reflect on the fact that the water vapour, in its passage through the pump 9, undergoes a transformation due to an increase of pressure with consequent heating. The heat acquired by the water vapour in this transformation equates exactly with the vaporisation heat surplus, that is to the depression heat.

Thus, by combining various elements of the drying kiln (that is the fixed component parts, the moving parts and the fluids) and whether or not a heat exchanger is used (that is in both the embodiments illustrated as well as the alternative embodiment which is described but not shown, there is obtained a heat pump operable to recover, apart from inevitable losses, all the heat contained in the water vapour extracted from the wood, as well as the thermal equivalent of the work done by the vacuum pump, and to up-grade this heat to a sufficiently high temperature to make it suitable for heating the wood in the drying chamber thereby producing more vapour to continue the process cyclically.

By adequately insulating the drying chamber the dissipation of heat to the environment can be reduced to a value equal to the work done by the vacuum pump, so that, apart from the initial preheating stage, operation of the boiler as a heat input is not required, the vacuum pump serving to provide enough heat input to maintain the process.

In FIG. 2 there are illustrated five successive stages, indicated A, B, C, D, E, of operation of a double chamber drying kiln, formed as an embodiment of the present invention. In FIG. 2 those component parts which are identical or fulfill the same function as corresponding parts in FIG. 1 have been identified with the same reference numerals although for drawing simplicity only those parts in operation during any one phase of operation are illustrated, the connecting means and the interception means necessary to bring about their operation, and inoperative components, being omitted.

Referring to FIG. 2A there are shown first and second drying chambers 22, 23 respectively which are identical with the chamber described with reference to FIG. 1. The phase of operation illustrated in FIG. 2A corresponds to the pre-heating; in this phase the boiler 7 is fired, water is circulated through the pipes 6 by the pump 8 (not shown in FIG. 2A) and the fans 5 are energised, whilst the interior of the first and second chambers 22 and 23 are held at atmospheric pressure and the vacuum pump 9 is de-energised.

The wood in the two chambers 22, 23 is thus heated until it reaches the desired temperature, all the required heat for this being derived from the boiler 7.

In FIG. 2B, the vacuum pump 9 is energised and the boiler 7 is turned off; the vacuum pump 9 is connected to the interior of the second chamber 23 to evacuate this whilst at the same time the heat exchanger 17 extracts heat from the water vapour, drawn from the second chamber 23 by the vacuum pump 9, and transfers it to the first chamber 22.

The fans 5 in the first chamber 22 are energised whilst those in the second chamber 23 are de-energised. The heat extracted from the water vapour drawn from the second chamber 23 by the heat exchanger 17 includes the condensation heat of the vapour extracted from the second chamber 23 and the thermal equivalent of the work done by the vacuum pump 9; this heat, upon transfer to the first chamber 22 raises the temperature of the wood therein above the temperature acquired during the first phase illustrated in FIG. 2A.

In the next phase illustrated in FIG. 2C, the vacuum pump 9 is cut off from the two chambers 22 and 23 and is de-energised, whilst the two chambers 22, 23 are directly interconnected with one another until the pressures in each are equalised; the fans 5 are energised during this phase. When the pressures are equalised the atmosphere in the second chamber 23 comprises water vapour drawn from the chamber 22 at a pressure less than atmospheric pressure. The second chamber 23 is then put into communication with the atmosphere allowing the entry of some outside air which is, therefore, humidified by the water vapour already in this chamber. The next phase, illustrated in FIG. 2D is the same as that illustrated in FIG. 2B with the first and second chambers 22, 23 reversed. In other words the first chamber 22 is subjected to the action of the vacuum pump 9 while the second chamber 23 is heated by the primary fluid from the heat exchanger 17. After this, the two chambers are connected together again as shown in FIG. 2E, the connections being exactly the same as in FIG. 2C the only difference being that now water vapour flows from the second chamber 23 towards the first chamber 22 until equalisation of the pressures in the two chambers is complete. Again, upon pressure, equalisation the pressure in the two chambers is sub-atmospheric.

After the phase illustrated in FIG. 2B, the cycle recommences with the phase illustrated in FIG. 2B and so on cyclically until the timber has been taken down to the required moisture content. It will be noted that the phase illustrated in FIG. 2C and 2E, which are effectively identical, both occur between phases B and D or D and B.

In practical embodiments of the present invention the number of chambers can be increased as desired, while only one vacuum pump and one heat exchanger are necessary.

If for the process envisaged the heating time should be a multiple of the vacuum pumping time, then it is only necessary to provide a suitable number of chambers and control valves, therefor. For example, if it is desired that the heating time shall be twice that of the vacuum pumping time, it is then necessary to provide three chambers.

However many chambers there are humidification of the air in a chamber is always effected with water vapour drawn from the or one of the other chambers. The discharge heat is partially recovered because it is transferred from one chamber to another while equalisation of pressure in the chambers is being effected.

The work of the vacuum pump, in the case of multiple chambers is lightened because the vacuum pump only acts upon a chamber after the pressure has been already reduced by connection with at least one other chamber which has been evacuated.

We claim:

1. In a vacuum drying kiln suitable for drying timber, comprising:
    at least one drying chamber,
    heating means including a primary fluid operable to transfer heat to the interior of said chamber,
    a vacuum pump containing a secondary fluid and having an inlet and an outlet,
    means selectively connected the inlet of said vacuum pump to said chamber whereby to produce in said chamber a pressure reduction for the purpose of evaporating water contained in the timber, and
    heat pump means including condenser means connected to the outlet of said vacuum pump for receiving said water vapour and said secondary fluid, said condenser means being operable to extract from the water vapour drawn from the wood at the operating temperature in said chamber a quantity of the heat conveyed thereby from the chamber, and also to extract from the water vapour a quantity of heat corresponding to the thermal equivalent of the work done on the water vapour by the vacuum pump, and thereby raise the temperature of this extracted heat above the said operating temperature in the chamber and transfer means for transferring said heat back to the interior of the said chamber via the said heating means.

2. The vacuum drying kiln of claim 1, wherein said condenser means is of the mixing kind, operating to mix the water vapour extracted from the wood with said secondary fluid.

3. The vacuum drying kiln of claim 2, wherein said secondary fluid is a liquid which is immiscible and nonemulsionable with water, and the specific heat of which is less than unity.

4. The vacuum drying kiln of claim 3, wherein the secondary fluid has a specific heat less then 0.5.

5. The vacuum drying kiln of claim 3, wherein the boiling point temperature of the secondary fluid is greater than that of water.

6. The vacuum drying kiln of claim 3, wherein the secondary fluid is a diathermic oil.

7. The vacuum drying kiln of claim 3, wherein the secondary fluid is a diathermic oil having the following characteristics:
    —specific gravity 0.750–0.9 at 15° C.
    —flash point: greater than 200° C.
    —viscosity index 95
    —viscosity:
    2.8 Engler at 50° C.
    1.45 Engler at 100° C.
    1.34 Engler at 114° C., and
    —specific heat 0.4 Cal/°C.

8. The vacuum drying kiln of claim 1, wherein said transfer means comprises a heat exchanger having:
    a primary circuit through which flows, in use, the mixture of secondary fluid and water vapour,
    a secondary circuit isolated from the primary circuit, apart from thermal contact therewith, through which flows said primary fluid, and
    means for directing said primary fluid from the heat exchanger, in which it absorbs heat by cooling the mixture of secondary fluid and water vapour in the primary, to the heating means where it loses heat to the interior of the drying chamber.

9. The vacuum drying kiln of claim 8, wherein:
    there are at least two drying chambers,
    means for selectively connecting the interior of each of said two chambers with said vacuum pump,
    valve means for closing off these connections when required so that the vacuum pump can be connected selectively to create a vacuum in either of said two chambers for a period of time during which water is evaporated from wood placed in this chamber,
    means for maintaining the interior of the other chamber at a greater pressure during this time in an atmosphere including water vapour, and
    means for circulating said primary fluid through the secondary circuit of the heat exchanger whereby to receive heat therefrom, and the heating means of the said other chamber whereby to effect heating of timber therein.

10. The vacuum drying kiln of claim 9, wherein there are further provided:
    means for connecting the two chambers together, including valve means, so that the pressures in the two chambers can be equalised by putting them in communication with each other.

11. The vacuum drying kiln of claim 1, wherein the condenser means is provided with means for inducing therein a pressure higher than that at which the water vapour is extracted from the drying chamber, whereby to increase the condensation temperature in the condenser.

12. A method of drying timber using a vacuum drying kiln having first and second drying chambers, heating means including a primary fluid operable to transfer heat to the interior of said chambers, a vacuum pump containing a secondary fluid and having an inlet and an outlet, means for selectively connecting the inlet to one of said chambers, a heat exchanger having a primary and secondary circuit and conduit means for selectively connecting said chambers directly to each other, comprising the steps of:
    (a)—heating the interior of at least the second drying chamber to raise the temperature of timber placed therein;
    (b)—evacuating said second chamber with said vacuum pump and extracting the heat from the air and water vapour drawn therefrom by means of said heat exchanger and transferring this heat into said first chamber;
    (c)—placing said first and second chambers into communication with one another through said conduit means and isolated from the atmosphere so that the pressures therein are equalised at a subatmospheric pressure;
    (d)—evacuating said first chamber with said vacuum pump, extracting the heat contained in the air and water vapour drawn therefrom by means of said heat exchanger and transferring this heat into the second chamber; and
    (e)—repeating steps (b), (c), and (d) cyclically in this sequence until the moisture content of the timber in the two chambers has fallen to the required level.

13. The method of drying timber as in claim 12, wherein the output from the vacuum pump is a mixture of said secondary fluid and air and water vapour drawn from whichever of the two chambers to which it is connected, and the secondary fluid being one which has a low specific heat thereby encouraging condensation of the water vapour in the primary circuit of the heat exchanger through which it flows.

14. The method of drying timber as in claim 13, wherein the heat from the water vapour and air drawn from the two chambers is transferred at the heat exchanger to said primary fluid which is circulated through the secondary circuit of the heat exchanger, and through said heating means in thermal contact with the interior of one of the first and second chambers.

15. The method of drying timber as in claim 14, wherein the temperature of said primary fluid at the outlet of the said heating means in thermal contact with the interior of said first and second chambers is not greater than the condensation temperature of water vapour at the pressure existing in the primary circuit of the heat exchanger.

* * * * *